United States Patent
Day

(10) Patent No.: US 9,781,993 B2
(45) Date of Patent: Oct. 10, 2017

(54) ROTATABLE HANDLE ATTACHMENT TO AN OBJECT HAVING A LONGITUDINAL EXTENT

(71) Applicant: Nathaniel R. Day, Gilbert, AZ (US)

(72) Inventor: Nathaniel R. Day, Gilbert, AZ (US)

(*) Notice: Subject to any disclaimer, the term of this patent is extended or adjusted under 35 U.S.C. 154(b) by 0 days.

(21) Appl. No.: 15/355,414

(22) Filed: Nov. 18, 2016

(65) Prior Publication Data

US 2017/0099936 A1   Apr. 13, 2017

Related U.S. Application Data

(63) Continuation of application No. 14/878,154, filed on Oct. 8, 2015, now Pat. No. 9,507,371.

(51) Int. Cl.
| | | |
|---|---|---|
| *A45C 13/26* | (2006.01) | |
| *A45F 5/10* | (2006.01) | |
| *F16C 11/10* | (2006.01) | |

(52) U.S. Cl.
CPC ............... *A45F 5/10* (2013.01); *F16C 11/10* (2013.01)

(58) Field of Classification Search
CPC . Y10T 16/469; Y10T 16/4713; Y10T 16/455; Y10T 16/4559; A45F 5/00; A45F 5/10; A45F 5/102; A45F 5/1026; A45F 5/1033; A01B 1/026; F16B 2/10; F16B 2/1073; B25G 1/06; B25G 3/00; B25G 3/02; B25G 3/04; B25G 3/38; B25F 5/026; F16C 11/10
See application file for complete search history.

(56) References Cited

U.S. PATENT DOCUMENTS

| | | | |
|---|---|---|---|
| 2,266,850 | A | 12/1941 | Connor |
| 4,059,209 | A | 11/1977 | Grisel |
| 4,466,523 | A | 8/1984 | De Carolis et al. |
| 4,523,781 | A | 6/1985 | Brody |

(Continued)

FOREIGN PATENT DOCUMENTS

| | | |
|---|---|---|
| EP | 1832379 A1 | 9/2007 |
| EP | 1974867 A1 | 10/2008 |
| EP | 2163357 A1 | 3/2010 |

OTHER PUBLICATIONS

Clamann et al, "Comparison of infant car seat grip orientations and lift strategies," Applied Ergonomics, pp. 1-8 (2011).

(Continued)

*Primary Examiner* — Chuck Mah
(74) *Attorney, Agent, or Firm* — Panitch Schwarze Belisario & Nadel LLP

(57) ABSTRACT

A handle assembly attachable to an object includes an auxiliary handle and a hook with a pivot arm pivotably attached thereto to define a passageway for the object. The pivot arm is pivotable between a first position, allowing access to the passageway, and a plurality of second positions, adjusting the size of the passageway to secure the object therein. A pawl, attached to the pivot arm, is movable between a first position, engageable with a ratchet of the hook, and a second position, disengaged therefrom. A shank extends the hook, and a clutch operatively couples the shank to the auxiliary handle. The clutch is actuatable between an engaged position and a disengaged position. The shank is moveable relative to the auxiliary handle in translation when the clutch is in the engaged position and the shank is rotatable relative to the auxiliary handle when the clutch is in the disengaged position.

10 Claims, 4 Drawing Sheets

(56) References Cited

U.S. PATENT DOCUMENTS

| | | |
|---|---|---|
| 5,207,476 A | 5/1993 | Payne |
| 5,544,935 A | 8/1996 | Cone, II et al. |
| D374,622 S | 10/1996 | Winborne |
| 5,632,657 A | 5/1997 | Henderson |
| 5,651,581 A | 7/1997 | Myers et al. |
| 5,725,422 A | 3/1998 | Leweck |
| 5,806,924 A | 9/1998 | Gonas |
| 5,870,800 A | 2/1999 | Chao |
| 5,887,950 A | 3/1999 | Kuo |
| 6,182,536 B1 | 2/2001 | Roberts et al. |
| 6,317,924 B1 | 11/2001 | Gallagher |
| D451,312 S | 12/2001 | Kain |
| 6,581,246 B1 | 6/2003 | Polette |
| 6,688,259 B2 | 2/2004 | Axel |
| 7,014,232 B2 | 3/2006 | Bosa |
| 7,097,223 B1 | 8/2006 | Bradford |
| 7,203,978 B1 | 4/2007 | Chang |
| 7,566,292 B1 | 7/2009 | Hauser et al. |
| 7,657,972 B2 | 2/2010 | Jenkins |
| 7,730,588 B1 | 6/2010 | Bernier |
| D619,367 S | 7/2010 | Zhang |
| 7,823,256 B2 | 11/2010 | Engelfried et al. |
| D629,301 S | 12/2010 | Jarrell et al. |
| 7,882,596 B2 | 2/2011 | Hixon |
| 8,104,145 B1 | 1/2012 | Hajianpour |
| 8,122,569 B2 | 2/2012 | Paul |
| 8,123,269 B2 | 2/2012 | Zhang |
| 8,381,358 B1 | 2/2013 | Frey |
| 8,453,296 B2 | 6/2013 | Swerdlick |
| 8,671,523 B1 | 3/2014 | Day |
| 8,894,456 B2 | 11/2014 | Bicknell |
| 2003/0077111 A1 | 4/2003 | Cheng |
| 2005/0011051 A1 | 1/2005 | Bosa |
| 2005/0016809 A1 | 1/2005 | Wu |
| 2005/0085352 A1 | 4/2005 | Baxter |
| 2006/0025060 A1 | 2/2006 | Funk |
| 2006/0026794 A1 | 2/2006 | Streetman |
| 2006/0087139 A1 | 4/2006 | Ayres |
| 2007/0060405 A1 | 3/2007 | Grossman et al. |
| 2007/0209162 A1 | 9/2007 | McRoberts et al. |
| 2008/0040892 A1 | 2/2008 | Jenkins |
| 2008/0196205 A1 | 8/2008 | Hixon |
| 2008/0217368 A1 | 9/2008 | Denton |
| 2009/0178520 A1 | 7/2009 | Engelfried et al. |
| 2010/0037424 A1 | 2/2010 | Swerdlick |
| 2010/0132163 A1 | 6/2010 | Hasei et al. |
| 2011/0173778 A1 | 7/2011 | Wales |
| 2012/0160531 A1 | 6/2012 | Martin et al. |
| 2012/0267924 A1 | 10/2012 | Chipman et al. |
| 2012/0319342 A1 | 12/2012 | Macey |
| 2013/0009414 A1 | 1/2013 | LeClaire et al. |
| 2013/0045099 A1 | 2/2013 | Bicknell |

OTHER PUBLICATIONS

Int'l Search Report and Written Opinion issued on Jul. 8, 2014 for Int'l Application No. PCT/US14/23203, 12 pages.
Int'l Preliminary Report on Patentability issued Sep. 24, 2015 in Int'l Application No. PCT/US2014/023203.
Extended Search Report issued Apr. 10, 2017 in EP Application No. 16192524.3, 4 pages.

ROTATABLE HANDLE ATTACHMENT TO AN OBJECT HAVING A LONGITUDINAL EXTENT

CROSS-REFERENCE TO RELATED APPLICATIONS

This application is a continuation of U.S. patent application Ser. No. 14/878,154, filed Oct. 8, 2015, entitled "Rotatable Handle Attachable To An Object Having A Longitudinal Extent," the entire contents of which are hereby incorporated by reference herein.

BACKGROUND OF THE INVENTION

The present invention relates generally to a handle removably attachable to an object and, more particularly, to an object having a generally tubular cross-sectional shape, such as a portion of a handle of a children's car seat or other seat or carrier or alternatively to exercise equipment, such as a portion of a horizontal gymnastic exercise bar.

Conventional car or other seats or carriers are well known for safely and conveniently transporting a relatively young or small child, such as a baby or infant. As a child grows, it can be awkward and/or difficult for an adult or other individual to lift or move such a car seat or other seat or carrier by a handle thereof.

For example, the orientation of the handle often requires that the palm of the individual carrying the seat must be in a frontward position (toward the direction of movement) or rearward position (opposite the direction of movement). However, it is not always ergonomically natural for many individuals to carry a relatively heavy weight at their side with their palm in either of these positions. Instead, it is often more natural for an individual's palm to be positioned inwardly (i.e., approximately ninety degrees from the direction of movement). Given the length of a typical car seat, it can be difficult to carry the car seat with the individual's palm positioned inwardly because doing so often results in the car seat hitting the individual (such as in the leg).

U.S. Pat. No. 8,671,523 B1 A (Day) discloses a carrier removably attachable to at least a portion of a handle of an object. The carrier includes a first housing having a handle and a base. The handle of the first housing is rotatable with respect to the base of the first housing about a first axis. A second housing is pivotally attached to the base of the first housing by a hinge and is rotatable about a second axis which extends generally perpendicularly to the first axis. The carrier is pivotable between an open configuration in which at least a portion of the base of the first housing is at least partially separated from the second housing to receive at least a portion of a handle of an object therein and a closed configuration in which at least a portion of the base of the first housing and the second housing combine to surround the handle of the object therebetween. A fastener positioned on one of the base of the first housing and the second housing generally opposite the hinge permits the base of the first housing to be locked to the second housing in the closed configuration. The load applied by the handle of the object is uniformly distributed between the hinge and the fastener.

U.S. Patent Application Publication No. 2011/0173778 A1 (Wales) discloses an auxiliary handle for attachment to the shaft on tools or implements. The auxiliary handle has a handle portion, a base portion, and an attachment portion. The handle portion has a body and a grip. The body is rotatably and slidably disposed in the base portion and may be adjusted into a variety of positions and/or orientations. The base portion is rotatably connected to the attachment portion which has a first jaw and a second jaw rotatably connected to the first jaw by an adjustable hinge having an adjuster which releasably tightens the inner surface of first jaw and the second jaw around the shaft of a tool. The space between the inner surfaces of the jaws forms a passageway for receiving the shaft of the tool. Similar to the Day carrier, the load applied by the shaft of the tool to the Wales auxiliary handle is uniformly distributed between the two jaws and transmitted through the hinge to the auxiliary handle.

Accordingly, there is a need in the art for a rotary handle releasably attachable to an object which does not subject a hinge of the handle to the load applied by an object to which the rotary handle is attached.

BRIEF SUMMARY OF THE INVENTION

Briefly stated, one embodiment of the present invention is directed to a rotatable handle assembly attachable to an object and graspable by a user's hand. The rotatable handle assembly has an auxiliary handle circumscribing a hand passageway configured to receive the user's hand therein. A collar is integrally formed as a portion of the auxiliary handle. A hook having an upper end and a lower end is attachable to the object. A shank is integrally formed with and extending from the upper end of the hook. The shank has a longitudinal axis. A clutch operatively couples the shank to the collar. The shank is moveable relative to the collar only in translation along the longitudinal axis when the clutch is in an engaged position. The shank is movable relative to the collar in rotation about the longitudinal axis when the clutch is in a disengaged position. The clutch is biased in the engaged position. A ratchet is on the upper end of the hook. A pivot arm is attached to the lower end of the hook. The pivot arm extends toward the ratchet and is rotatable about a transverse axis perpendicular to the longitudinal axis of the shank. A pawl is attached to the pivot arm for rotation therewith. The pawl is slideable in translation relative to the pivot arm between a first pawl position in which a free end of the pawl engages the ratchet preventing rotation of the pivot arm and a second pawl position in which the free end of the pawl is disengaged from the ratchet. The pawl is biased in the first pawl position.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, the drawings show embodiments which are presently preferred. It should be understood, however, that the invention is not limited to the precise arrangements and instrumentalities shown.

In the drawings.

DETAILED DESCRIPTION OF THE INVENTION

Figure 1:
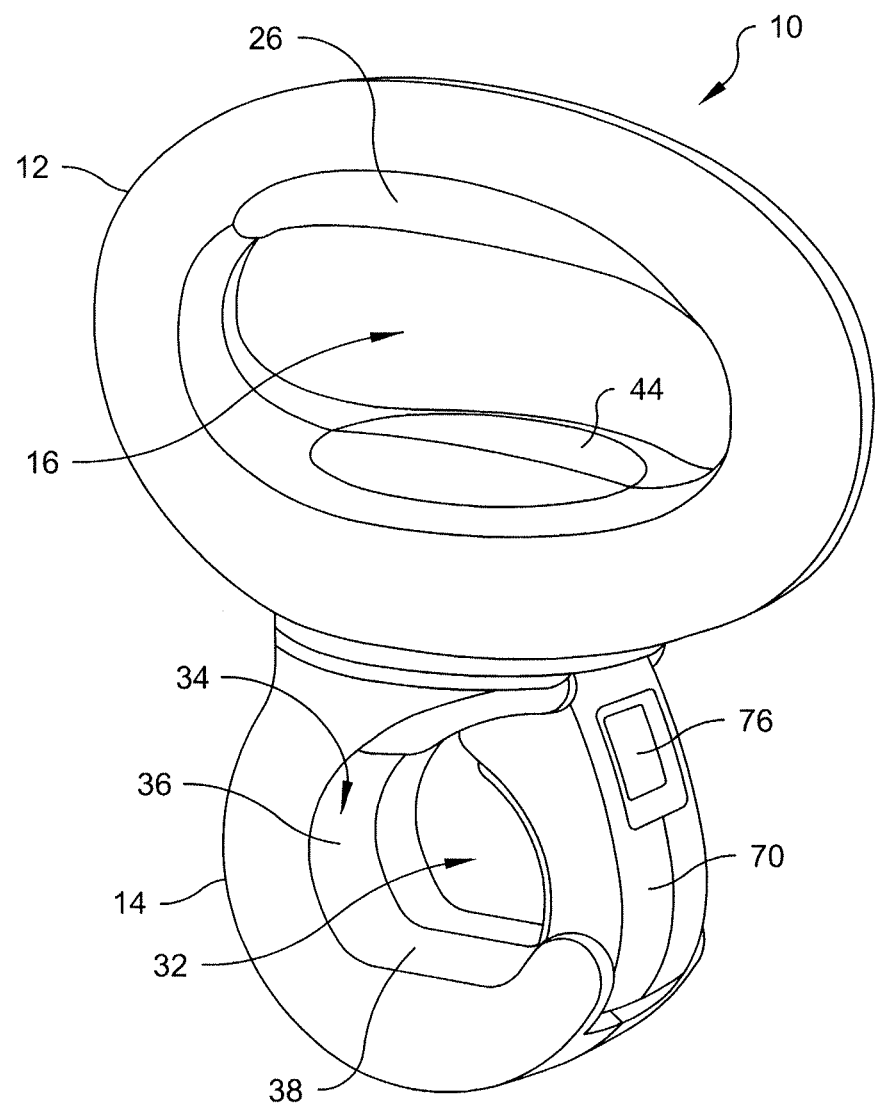
FIG. 1 is a front perspective elevation view of a first preferred embodiment of the rotatable handle in accordance with the present invention.
Figure 2:
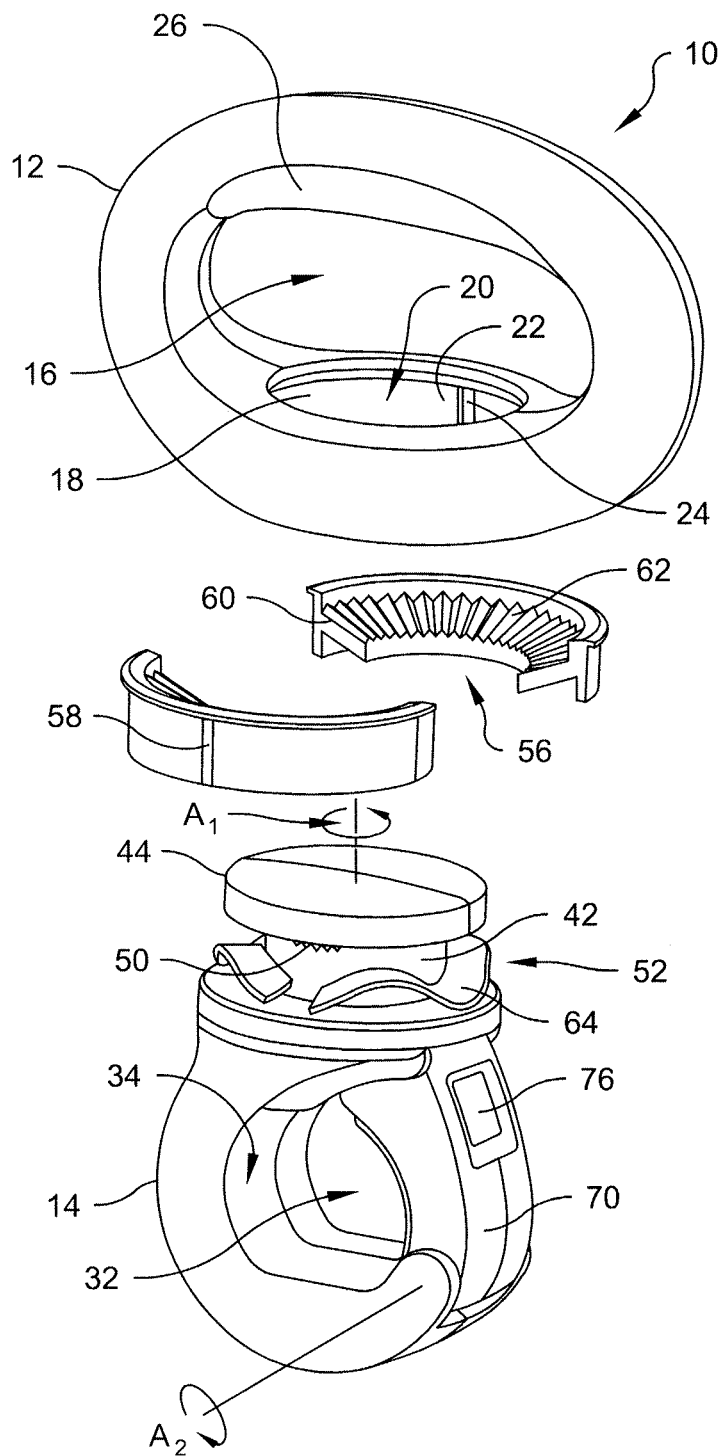
FIG. 2 is an exploded front perspective elevation view for the rotatable handle of FIG. 1.
Figure 3:
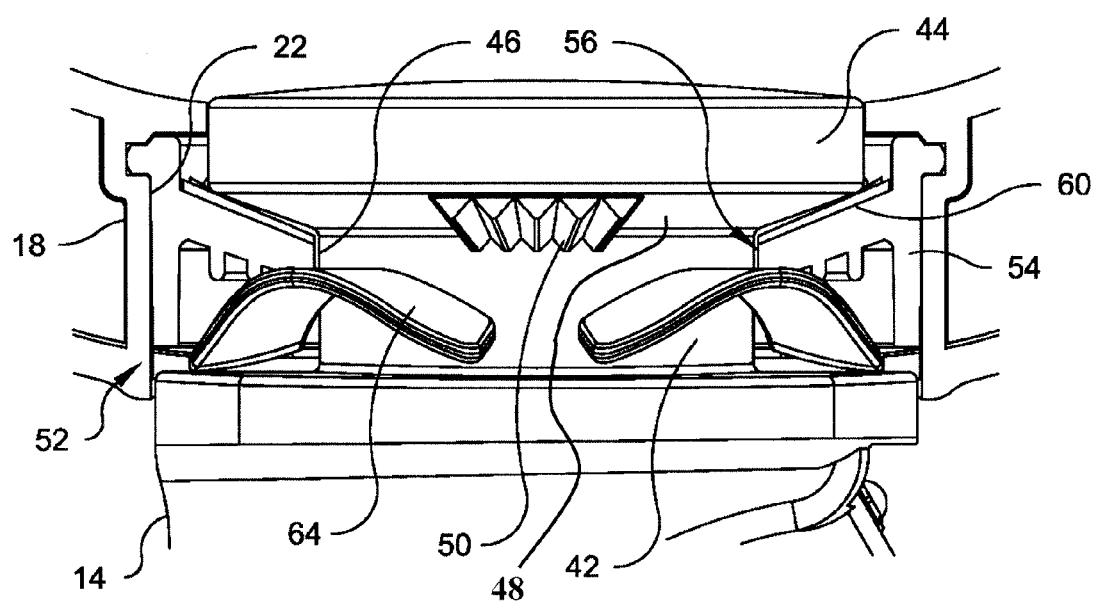
FIG. 3 is an enlarged front cross sectional view, partially in perspective, of the clutch portion of the rotatable handle of FIG. 1.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the rotatable handle, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first end be could be termed a second end, and, similarly, a second end could be termed a first end, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a rotatable handle in accordance with the present invention.

Referring to the drawings in detail, where like numerals indicate like elements throughout, there is shown in FIGS. 1-4 a first preferred embodiment of the rotatable handle, generally designated 10, and hereinafter referred to as the "rotatable handle" 10 in accordance with the present invention. The rotatable handle 10 is attachable to an object and graspable by a user's hand. Preferably the object is a tubular object having a generally circular cross section and a longitudinal extent.

The rotatable handle 10 has an auxiliary handle 12 coupled to a hook 14 removably attachable to the object (not shown). The auxiliary handle 12 circumscribes a hand passageway 16 configured to receive a user's hand therein. A collar 18 is integrally formed as a portion of the auxiliary handle 12. The collar 18 has a collar bore 20 therethrough. The radially inwardly facing surface 22 of the collar bore 20 has a longitudinally extending keyway 24 therein. In some embodiments, a compliant ergonomic grip 26 is preferably, but not necessarily, attached to an inner portion of the auxiliary handle 12 opposite the collar 18.

The hook 14 has an upper end 28 and a lower end 30 and defines an object passageway 32 adjustably sized to receive the object. The inwardly facing (or concave) surface 34 of the hook 14 has an arcuate portion 36 and a straight portion 38. In some embodiments, one or more compliant hook pads 40 are attached to the inwardly facing surface 34 of the hook 14. A shank 42 is integrally formed with and extends from the upper end 28 of the hook 14. The shank 42 has a longitudinal axis $A_1$. A flange 44 is integrally formed with the free end 46 of the shank 42 and has a downwardly facing flange surface 48 extending radially outwardly from the shank 42. The flange surface 48 has a plurality of flange teeth 50 extending therefrom.

A clutch 52 operatively couples the shank 44 to the collar portion 18 of the handle 12. The shank 42 is moveable only in translation along the longitudinal axis $A_1$ relative to the collar 18 when the clutch 52 is in an engaged position. The shank 42 is movable in rotation about the longitudinal axis $A_1$ relative to the collar 18 when the clutch 52 is in a disengaged position. The clutch 52 is biased in the engaged position.

The clutch 52 comprises a clutch ring 54 disposed in the collar 18. Preferably, the clutch ring 54 is formed as two semi-cylindrical pieces that snap together. However, in some embodiments, the clutch ring 54 may be a one-piece molded construction. The clutch ring 54 has a clutch-ring bore 56 within which a portion of the shank 42 is disposed. The clutch ring 54 has a key 58 extending radially outwardly into the keyway 24 of the collar 18 preventing rotation of the clutch ring 54 relative to the collar 18.

The clutch ring 54 has an annular clutch-ring surface 60 opposing and frictionally engaging the flange surface 48 when the clutch 52 is in the engaged position. In some embodiments, the clutch-ring surface 60 preferably, but not necessarily, has a plurality of clutch-ring teeth 62 extending therefrom and engaged with the plurality of flange teeth 62 when the clutch 52 is in the engaged position. In some embodiments, a wave washer 64 biases the clutch 52 in the engaged position.

A ratchet 66 is integrally formed on the arcuate, inwardly facing surface portion 34 of the upper end 28 of the hook 14. The ratchet 66 has a plurality of ratchet teeth 68.

A pivot arm 70 is attached to the lower end 30 of the hook 14. The pivot arm 70 extends toward the ratchet 66 and is rotatable about a transverse axis $A_2$ perpendicular to the longitudinal axis $A_1$ of the shank 14 from a first position $P_1$ allowing access to the object passageway 32 to one of a plurality of second positions $P_2$ adjusting the size of the object passageway 32 to secure the object therein. In some embodiments, one or more compliant pivot arm pads 72 are attached to the inner surface 74 of the pivot arm 70.

A pawl 76 is attached to the pivot arm 70 for rotation therewith. The pawl 76 is slideable in translation relative to the pivot arm 70 between a first pawl position $P_3$ in which a free end 78 of the pawl 76 engages the ratchet 66 preventing rotation of the pivot arm 70 and a second pawl position $P_4$ in which the free end 78 of the pawl 76 is disengaged from the ratchet 66. The pawl 76 is biased in the first pawl position P3, by a biasing member 82 which preferably is a coil spring. At least one pawl tooth 80 on the free end 78 of the pawl 76 engages one ratchet tooth of the plurality of ratchet teeth 68 preventing rotation of the pivot arm 70 when the pawl 76 is in the first pawl position $P_3$ and the pivot arm 70 is in the second pivot arm position $P_2$.

The foregoing components (or piece parts) comprising the rotatable handle 10 may be fabricated by molding, casting, or machining. With the exception of the biasing elements which are preferably spring steel, the fabrication material of choice is a polymeric material, although, in some instances, a metal such as aluminum may be used. The auxiliary handle 12, hook 14, and pivot arm 72 are each preferably formed as two complementary pieces that are joined together by an adhesive, threaded fasteners or a snap fit manner well known in the art.

Figure 4:
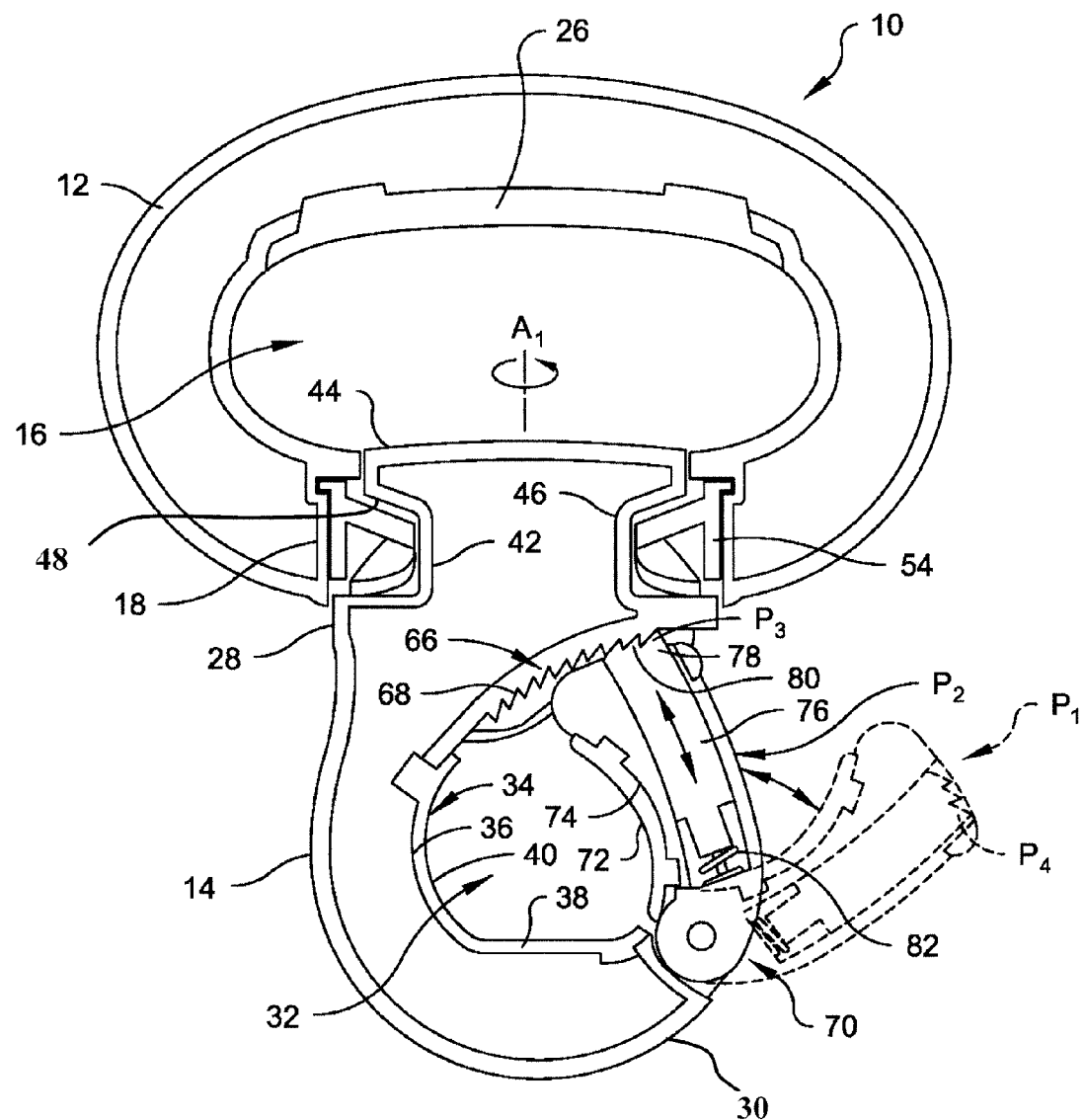
FIG. 4 is a front elevation view in cross section of the rotatable handle of FIG. 1.

The use of the rotatable handle 10 is hereafter disclosed with respect to an object that is a carrier, such as a baby carrier or basket, having a carrier handle which is at least partially arcuate and/or in the shape of a generally inverted "U" and which has a generally circular cross-sectional shape. Referring to FIG. 4, prior to use, the rotatable handle 10 is in the configuration shown therein. The pivot arm 70 is in the second pivot arm position $P_2$ forming with the radially inwardly facing (or concave) surface of the hook 14 the closed object passageway 32 and the pawl 76 is in the first pawl position $P_3$ engaging the ratchet 66.

As a first step in attaching the rotatable handle 10 to the handle of the carrier, the user moves the pawl 76 in translation from the first pawl position $P_3$ to the second pawl position $P_4$, disengaging the ratchet 66 and allowing the pivot arm 70 to move in rotation. As a second step, the user rotates the pivot arm 70 from the second pivot arm position $P_2$ to the first pivot arm position $P_1$, providing access to the object passageway 32. During the second step, once the pivot arm 70 clears the ratchet 66, the pawl 76 may return to the first pawl position $P_3$, under the force of the pawl biasing member 82. As a third step, the carrier handle is placed in the object passageway 32. As a fourth step, the pivot arm 70 is rotated to the second pivot arm position $P_2$ through an angular displacement sufficient to place the pivot arm pad 72 in compression against the carrier handle and to have the pawl 76 re-engage the ratchet 66 releasably retaining the carrier handle in the object passageway 32.

If the orientation of the carrier handle relative to the auxiliary handle 12 causes the user discomfort when the user grasps and lifts the auxiliary handle 12 with the weight of the carrier and its contents, if any, supported by the hook 14, the clutch 52 may be disengaged to allow rotation of the shank 42 relative to the handle 12 until the palm of the user's hand grasping the auxiliary handle 12 is in an ergonomically natural position. The clutch 52 may be disengaged allowing the desired rotation by pressing the auxiliary handle 12 downwardly toward the carrier handle, until the teeth 50 on the flange 44 of the shank 42 no longer engage the teeth 62 on the clutch ring 54.

In an alternative use, for example, if the position of an athlete's palm grasping a horizontal gymnastic exercise bar is ergonomically uncomfortable, the hook 14 of the rotational handle 10 may be attached to the horizontal bar in a manner similar to the steps described above for use with a carrier such that the auxiliary handle 12 suspended downwardly from the bar. The auxiliary handle 12 may be rotated to an ergonomically comfortable position by disengaging the clutch 52 as discussed above.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

I claim:

1. A handle assembly removably attachable to an object and graspable by a user's hand, the handle assembly comprising:
    an auxiliary handle circumscribing a hand passageway to receive the user's hand therein;
    a hook and a pivot arm pivotably attached to the hook, the hook and the pivot arm defining an adjustably sized object passageway to receive the object, wherein the pivot arm is pivotable between a first position, allowing access to the object passageway, and a plurality of second positions, adjusting the size of the object passageway to secure the object therein;
    a ratchet positioned on the hook;
    a pawl attached to the pivot arm for pivoting therewith, the pawl being movable between a first pawl position in which a free end of the pawl is engageable with the ratchet, thereby preventing pivoting of the pivot arm toward the first position thereof, and a second pawl position in which the free end of the pawl is disengaged from the ratchet, thereby permitting pivoting of the pivot arm toward the first position thereof;
    a shank extending from an upper end of the hook, the shank having a longitudinal axis; and
    a clutch operatively coupling the shank to the auxiliary handle, the clutch being actuatable between an engaged position and a disengaged position, wherein the shank is moveable relative to the auxiliary handle only in translation along the longitudinal axis when the clutch is in the engaged position and the shank is rotatable relative to the auxiliary handle about the longitudinal axis when the clutch is in the disengaged position.

2. The handle assembly of claim 1, wherein the auxiliary handle further comprises a collar and the clutch comprises a clutch ring disposed in the collar, the clutch ring having a clutch-ring bore within which a portion of the shank is disposed.

3. The handle assembly of claim 2, wherein the collar has a collar bore therethrough, the collar bore having a longitudinally extending keyway therein and the clutch ring has a key extending radially outwardly into the keyway to prevent rotation of the clutch ring relative to the collar.

4. The handle assembly of claim 3, further comprising a flange at a free end of the shank, the flange having a flange surface extending radially outwardly from the shank and the clutch ring has an annular clutch-ring surface opposing and frictionally engaging the flange surface when the clutch is in the engaged position.

5. The handle assembly of claim 4, wherein the flange surface has a plurality of flange teeth extending therefrom and the clutch-ring surface has a plurality of clutch-ring teeth extending therefrom and engaged with the plurality of flange teeth when the clutch is in the engaged position.

6. The handle assembly of claim 1, wherein a wave washer biases the clutch in the engaged position.

7. The handle assembly of claim 6, wherein the clutch is movable into the disengaged position thereof via manual advancement of the auxiliary handle toward the hook, against the bias of the wave washer.

8. The handle assembly of claim 1, wherein an upper end of the hook has an internal surface portion, the ratchet being integrally formed thereon by a plurality of ratchet teeth.

9. The handle assembly of claim 1, wherein the pawl is manually translatable between the first and second pawl positions thereof.

10. The handle assembly of claim 1, further comprising a compliant ergonomic grip attached to an upper and inner portion of the auxiliary handle.

* * * * *